(12) United States Patent
Ohmura

(10) Patent No.: US 6,219,954 B1
(45) Date of Patent: Apr. 24, 2001

(54) LINE GUIDE RING AND LINE GUIDE RING ATTACHMENT STRUCTURE

(75) Inventor: Ryuichi Ohmura, Shizuoka (JP)

(73) Assignee: Fuji Kogyo Co., Ltd., Shizuoka (JP)

( * ) Notice: Subject to any disclaimer, the term of this patent is extended or adjusted under 35 U.S.C. 154(b) by 0 days.

(21) Appl. No.: 09/419,972

(22) Filed: Oct. 18, 1999

(30) Foreign Application Priority Data

Nov. 13, 1998 (JP) .................................. 10-323602

(51) Int. Cl.$^7$ .................................................. A01K 87/04
(52) U.S. Cl. .................................................. 43/24
(58) Field of Search ..................................... 43/24

(56) References Cited

U.S. PATENT DOCUMENTS

| 3,769,736 | * | 11/1973 | Nydam | .......... | 43/24 |
| 4,035,454 | * | 7/1977 | Klein | .......... | 43/24 |
| 4,142,317 | | 3/1979 | Klein | .......... | 43/24 |
| 4,287,678 | * | 9/1981 | Yamamoto | .......... | 43/24 |

FOREIGN PATENT DOCUMENTS

| 948678 | * | 8/1949 | (FR) | .......... | 43/24 |
| 966663 | * | 10/1950 | (FR) | .......... | 43/24 |
| 7459 | * | 4/1908 | (GB) | .......... | 43/24 |
| 52-103182 | | 8/1977 | (JP) . | | |
| 53-73996 | | 6/1978 | (JP) . | | |
| 55-58039 | | 4/1980 | (JP) . | | |
| 5-284884 | * | 11/1993 | (JP) | .......... | 43/24 |
| 8-252040 | | 10/1996 | (JP) . | | |
| 9-233977 | | 9/1997 | (JP) . | | |

* cited by examiner

Primary Examiner—Darren W. Ark
(74) Attorney, Agent, or Firm—Oliff & Berridge, PLC

(57) ABSTRACT

To provide a line guide ring which can be simply formed and which has a pull-out prevention structure which does not disturb a winding configuration of a winding thread. Micro-irregularities are formed on a top surface of an attachment leg portion of a line guide ring, the attachment leg portion is fastened to a fishing pole by using a nylon winding thread with a diameter of 0.1 mm–0.9 mm. A sufficient amount of a liquid reaction hardening resin adhesive is pasted on a surface of the wound winding thread, and the adhesive permeates into concave portions of the irregularities of the attachment leg portion.

7 Claims, 2 Drawing Sheets

LINE GUIDE RING AND LINE GUIDE RING ATTACHMENT STRUCTURE

BACKGROUND OF THE INVENTION

Field of Invention

This invention relates to a line guide ring for a fishing pole which is attached to a fishing pole in order to guide a fishing line.

A line guide ring for a fishing pole which guides a fishing line, and which is fixed to the fishing pole is normally structured by a guide ring through which a fishing line goes and a frame which is fixed to the fishing pole and supports the guide ring. The frame is formed by a ring-shaped holding frame with an internal side to which the guide ring is attached and a support leg(s) which is formed integrally with the holding frame and has an attachment leg portion. This type of line guide ring can be fixed to the fishing pole by fastening the fixing leg portion onto the fishing pole with a winding thread and, in order to prevent the winding thread from being released, it is common that adhesive is painted on the winding thread which is wound around the attachment leg portion. However, there is a case such that a fastening force of the winding thread is released because of repeated distortion of the fishing pole and the attachment leg portion is released from the winding thread. Therefore, as described in, for example, Japanese Laid-Open Patent Application No. 8-252040, many grooves are formed in the top surface of the attachment leg portion so that the lower side of the winding thread can be inserted into the top surface of the attachment leg portion. Furthermore, as described in Japanese Laid-Open Utility Model Application No. 53-73996, many spike-shaped engaging protrusions are formed on the top surface of the attachment leg portion, many holes are provided in the attachment leg portion, or the like. Therefore, releasing of the line guide ring is prevented.

By winding a winding thread along grooves formed on the top surface of the fixing leg portion, movement of the attachment leg portion in a direction perpendicular to the winding direction, that is, releasing of the attachment leg portion from the winding thread, can be effectively prevented. However, if a winding thread with a large diameter compared to a width of the grooves is used, the effect of pull-out prevention is significantly reduced, and if a winding thread with a small diameter compared to the width of grooves is used, the winding thread falls into the grooves, so it is impossible to wind the winding thread without gaps. Furthermore, the effect of pull-out prevention of the attachment leg portion can be secured by forming a spike-shaped engaging protrusion on the top surface of the attachment leg portion, or by making a hole(s) in the attachment leg portion, and increasing the friction force between the attachment leg portion and the winding thread. However, an operation to form an engaging protrusion(s) or to create a hole(s) is never an easy thing, and this type of structure increases the manufacturing cost of the line guide ring.

Therefore, an object of this invention is to provide a line guide ring which can be simply formed and which has a pull-out prevention structure which does not disturb a winding configuration of a winding thread. Additionally, another object of this invention is to provide a structure for attaching this type of line guide ring to a fishing pole that has a sufficient pull-out prevention function.

SUMMARY OF THE INVENTION

A line guide ring of the invention to achieve the object is structured by a ring-shaped metal holding frame with an internal side to which a guide ring is fixed and a support leg which is formed integrally with the holding frame and has an attachment leg portion. The attachment leg portion is fastened and fixed to a fishing pole by a winding thread. On the portion of the top surface of the attachment leg portion which is fastened by the winding thread, micro-irregularities are formed over an area of a wide range. In order to fix the line guide ring to a fishing pole, the attachment leg portion is wound by the winding thread many times and fastened to the fishing pole, and an adhesive layer is coated and formed on a surface of the winding thread by which the attachment leg portion is fastened. In coating the adhesive, a sufficient amount of adhesive is used so that an adhesive layer is formed such that adhesive goes between adjacent wraps of the winding thread, reaches the top surface of the attachment leg portion, and covers the winding thread. Adhesive which has reached the top surface of the attachment leg portion is inserted into a concave portion of the micro-irregularities formed on the top surface of the attachment leg portion and hardened, so to prevent the attachment leg portion from being shifted and moved from the adhesive layer. Therefore, the attachment leg portion and the winding thread can be held by the adhesive layer so as not to be shifted, and the attachment leg portion can be fixed so that it cannot be pulled out from the winding thread. Irregularities are normally formed on the entire top surface of the attachment leg portion, but can be excluded from a base portion, a rear end part, or a side end part of the attachment leg portion.

Usually, a frame of a line guide ring is integrally formed from a metal plate by a pressing process. Here, in order to form the micro-irregularities on the top surface of the attachment leg portion, micro-irregularities can be formed on the top surface of an attachment leg portion of a press forming metal-mold cavity of the line guide ring. A metal-mold cavity is usually formed by electrical discharge machining or a cavitation process, and micro-irregularities are formed so that the top surface of the attachment leg portion of the cavity is roughly processed, for example, with surface roughness or the surface roughness degree Rmax (maximum height: height difference between the highest mountain and the lowest valley) of 32 $\mu$m–75 $\mu$m. If a line guide ring is formed by a metal mold such that the top surface of the attachment leg portion of the cavity is roughly processed, the surface roughness of the top surface of the attachment leg portion is Rmax 32 $\mu$m–75 $\mu$m, according to the surface roughness of the top surface of the attachment leg portion of the cavity, and desired irregularities can be formed on the top surface. If the surface roughness of the top surface of the attachment leg portion is less than Rmax 32 $\mu$m, the depth of the concave part of the irregularities is insufficient, and a substantial effect of pull-out prevention between the attachment leg portion and the adhesive layer cannot be expected. If the surface roughness of the top surface of the attachment leg portion exceeds Rmax 75 $\mu$m, it becomes difficult to wind the winding thread without any space. In order to maintain the pull-out prevention effect over a long period of time and easily overwrap and wind an extremely thin winding thread without any space, it is effective to have the surface roughness of the top surface of the attachment leg portion of the cavity or the top surface of the attachment leg portion as Rmax 40 $\mu$m–65 $\mu$m.

BRIEF DESCRIPTION OF THE DRAWINGS

The following explains embodiments of the invention with reference to the drawings.

DETAILED DESCRIPTION OF PREFERRED EMBODIMENTS

Figure 1:
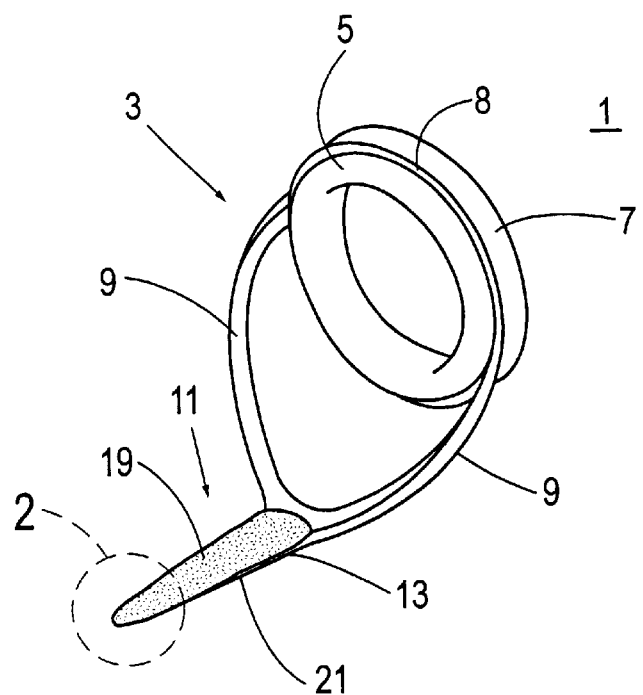
FIG. 1 is a perspective view of a line guide ring related to this invention.
Figure 2:
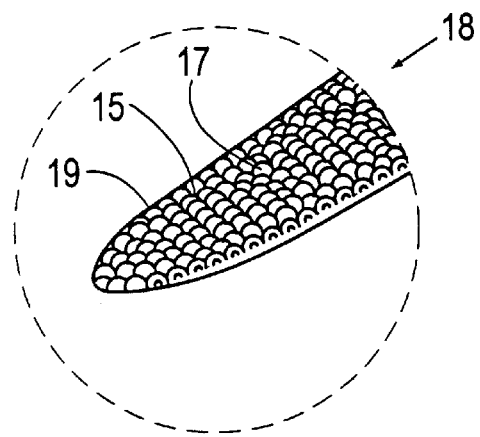
FIG. 2 is an enlarged view of Part A of FIG. 1.
Figure 3:
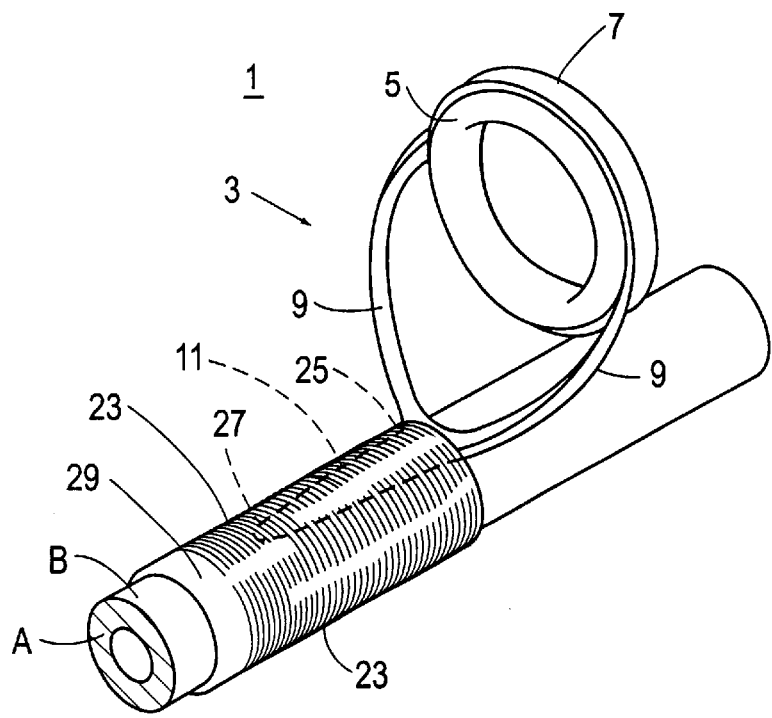
FIG. 3 is a perspective view of a fishing pole to which a line guide ring related to this invention is attached.

A frame 3 of a line guide ring 1 is formed integrally by performing press working such as bending and drawing to a corrosion resisting metal plate such as stainless steel or titanium. The frame comprises a holding frame 7 which has a ceramic hardened guide ring 5 attached to an internal side 8 of the holding frame 7 (as shown in FIG. 1). At least one support leg 9 extends downward in the rear direction. In the preferred embodiment, as shown in FIGS. 1 and 3, there are two support legs 9 which extend downward in the rear direction from the right and left sides of the holding frame 7 and bowing outward from each other. Additionally, an attachment leg portion formed at the rear end of the support legs 9 allow the line guide ring 1 to be attached to a circumstantial surface B (FIG. 3). The entire top surface 18 of the attachment leg portion 11, except for a small portion at each side part 13 (only one side is depicted), is roughly processed at a surface roughness Rmax 40 $\mu$m–65 $\mu$m (both side parts 13 are more smoothly processed) so that irregularities 19, comprising micro concave parts 15 and micro convex parts 17, are formed on the top surface.

A bottom surface 21 of the attachment leg portion 11 is bent and formed so as to follow the circumferential surface of a fishing pole. As shown in FIG. 3, the line guide ring 1 is arranged so that the bottom surface 21 of the attachment leg portion 11 contacts the top side portion of a circumferential surface B of a fishing pole A, and the attachment leg portion 11 is fastened to the fishing pole A by using a nylon winding thread 23 (FIG. 3 is a perspective view of the fishing pole A to which the line guide ring 1 is attached). In the preferred embodiment, the winding thread has a diameter of about 0.1 mm–0.9 mm. The winding thread 23 is wound, with no space in between adjacent windings, from the base part 25 of the attachment leg portion 11 to a portion beyond the rear end 27 of the attachment leg portion 11 and fairly rearward. A liquid reaction hardening resin adhesive 29 is pasted on the wound winding thread 23 from a portion slightly frontward of the front end of the wound winding thread 23 to a portion slightly rearward of the rear end of the wound winding thread 23.

Figure 4:
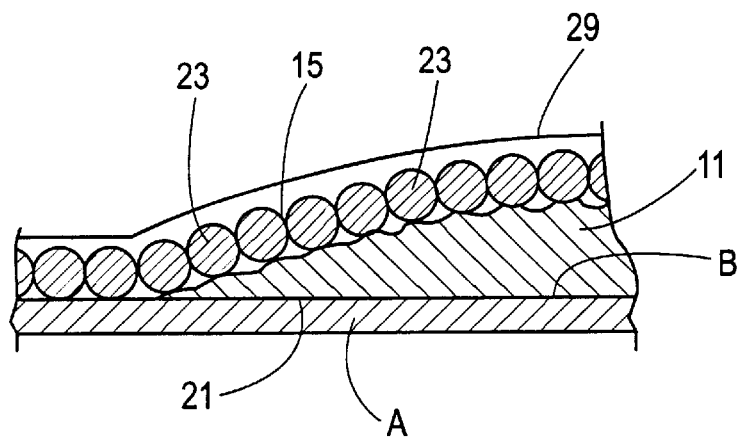
FIG. 4 is a cross-sectional view of section X—X.

By pasting a sufficient amount of liquid reaction hardening resin adhesive 29, the adhesive 29 goes through the winding thread 23 and reaches the top surface of the attachment leg portion 11. On the top surface of the attachment leg portion 11, many concave parts 15 with a sufficient depth are formed, and the adhesive 29 which has reached the top surface of the attachment leg portion 11, as shown in FIG. 4, hardens in a state in which the adhesive fills in the concave parts 15 (FIG. 4 is a cross-sectional view showing the formation of the layer of the adhesive 29). Therefore, the hardened adhesive layer 29 takes in the winding thread 23 and engages with the top surface of the attachment leg portion 11.

As explained above, the line guide ring of this invention has an effective structure for pull-out prevention which does not adversely affect the winding configuration of a winding thread, and which can be easily manufactured.

Although preferred embodiments of this invention are illustrated, it should be understood that various modifications and rearrangements of parts may be resorted to without departing from the scope of the invention disclosed and claimed therein.

What is claimed is:

1. A line guide ring adapted to be attached to a fishing pole by a winding thread, comprising:

a ring-shaped holding frame with an internal side to which a guide ring is fixed and at least one support leg which is formed integrally with the holding frame and has an attachment leg portion, the attachment leg portion adapted to be fastened and fixed to a fishing pole by a winding thread; and wherein on a portion of a top surface of the attachment leg portion, which is to be fastened by the winding thread, a plurality of micro-irregularities are formed such that the top surface of the attachment leg portion has a maximum surface roughness of about 35 $\mu$m–75 $\mu$m.

2. The line guide ring as set forth in claim 1, wherein the micro-irregularities are formed by irregularities formed when the attachment leg portion is press-worked by using a metal mold in which a corresponding plurality of micro-irregularities are formed on a surface of a mold cavity.

3. The line guide ring as set forth in claim 1, wherein the ring-shaped holding frame is metal.

4. The line guide ring as set forth in claim 1, further comprising a winding thred having a diameter in the range of about 0.1 mm–0.9 mm.

5. The line guide ring as set forth in claim 1, wherein the attachment leg has two side portions which are relatively smooth.

6. A line guide ring attaching structure for attaching a line guide ring to a fishing pole, comprising:

a ring-shaped metal holding frame and at least one support leg which is formed integrally with the holding frame and has an attachment leg portion, the line guide ring attaching structure adapted to be attached to a fishing pole, a winding thread which is wound over a top surface of the attachment leg portion when the attachment leg portion is fixedly fastened to the fishing pole, and an adhesive layer coated and formed on a surface of the winding thread when the attachment leg portion is fastened by the winding thread, the adhesive layer hardening after reaching a surface of the attachment leg portion and entering into concave portions of a plurality of micro-irregularities formed on the top surface of the attachment leg portion such that the top surface of the attachment leg portion has a maximum surface roughness of about 35 $\mu$m–75 $\mu$m.

7. The line guide ring attaching structure as set forth in claim 6, wherein the winding thread has a diameter in the range of about 0.1 mm–0.9 mm.

* * * * *